(12) United States Patent
Turbeville et al.

(10) Patent No.: US 8,005,727 B2
(45) Date of Patent: Aug. 23, 2011

(54) DISTRIBUTED-USER SHIPPING SYSTEM

(75) Inventors: Dan Turbeville, Snellville, GA (US);
Dave Gittings, Roswell, GA (US); John Cornelius, Roswell, GA (US); Bob Jones, Lawrenceville, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 1666 days.

(21) Appl. No.: 10/323,885

(22) Filed: Dec. 18, 2002

(65) Prior Publication Data
US 2003/0144871 A1 Jul. 31, 2003

Related U.S. Application Data

(60) Provisional application No. 60/344,111, filed on Dec. 27, 2001.

(51) Int. Cl.
*G06Q 10/00* (2006.01)
*G06Q 30/00* (2006.01)

(52) U.S. Cl. .......................................... 705/28; 705/330

(58) Field of Classification Search ........................ None
See application file for complete search history.

(56) References Cited

U.S. PATENT DOCUMENTS

| | | | |
|---|---|---|---|
| 5,047,959 A * | 9/1991 | Phillips et al. ................ | 715/853 |
| 5,117,364 A | 5/1992 | Barns-Slavin et al. | |
| 5,485,369 A | 1/1996 | Nichols et al. | |
| 5,631,827 A | 5/1997 | Nicholls et al. | |
| 5,699,258 A | 12/1997 | Thiel | |
| 5,832,459 A * | 11/1998 | Cameron et al. ................ | 705/26 |
| 5,910,896 A | 6/1999 | Hahn-Carlson | |
| 6,282,525 B1 | 8/2001 | Kubatzki et al. | |
| 6,321,214 B1 | 11/2001 | Thiel | |
| 6,865,258 B1 * | 3/2005 | Polcyn ........................ | 379/88.01 |
| 7,124,107 B1 * | 10/2006 | Pishevar et al. ................ | 705/37 |
| 2002/0022983 A1 * | 2/2002 | Barton .............................. | 705/7 |
| 2002/0023023 A1 | 2/2002 | Borecki et al. | |

(Continued)

FOREIGN PATENT DOCUMENTS
CA 2193024 6/1997
(Continued)

OTHER PUBLICATIONS

Office Action dated Aug. 1, 2008, Japanese Patent Application No. 2003-558765, filed Dec. 19, 2002.

*Primary Examiner* — Asfand Sheikh
(74) *Attorney, Agent, or Firm* — Alston & Bird LLP

(57) ABSTRACT

A system and method is described for controlling user access to a carrier's shipping services for delivery of a package. The system controls the user's access to the carrier's services by either limiting the selection of locations from which a package can be shipped to fewer than those described by the carrier's service area, or by limiting the user's ability to select shipping service levels to fewer than those provided by the carrier. Such limitation may be by way of displaying only a limited collection of ship from locations and service levels, or by pre-populating and locking ship from information submission fields on a web page. The distributed-user shipping system may reside on a client server or mobile computer that is connected to the carrier's server and transmits various shipping location information and service level selections to the carrier to facilitate shipping of packages while controlling the scope of shipping services provided.

23 Claims, 12 Drawing Sheets

U.S. PATENT DOCUMENTS

| | | |
|---|---|---|
| 2002/0030854 A1 | 3/2002 | Schutz et al. |
| 2002/0035857 A1 | 3/2002 | Stein et al. |
| 2002/0038224 A1 | 3/2002 | Bhadra |
| 2002/0049622 A1 | 4/2002 | Lettich et al. |
| 2002/0065738 A1 | 5/2002 | Riggs et al. |
| 2002/0077847 A1 | 6/2002 | Thiel |
| 2002/0087371 A1 | 7/2002 | Abendroth |
| 2002/0095308 A1 | 7/2002 | Pragelas et al. |
| 2002/0095347 A1* | 7/2002 | Cummiskey .................... 705/26 |
| 2002/0099567 A1 | 7/2002 | Joao |
| 2002/0135802 A1 | 9/2002 | Perez et al. |
| 2004/0153424 A1 | 8/2004 | Lussow et al. |
| 2004/0254808 A1* | 12/2004 | Bennett et al. .................... 705/1 |

FOREIGN PATENT DOCUMENTS

| | | |
|---|---|---|
| CA | 2361514 | 8/2000 |
| JP | 2004-306763 | 10/1992 |
| JP | 2001-097513 | 4/2001 |
| JP | 2001-315916 | 11/2001 |
| JP | 2001-319276 | 11/2001 |
| MX | PA03007375 | 3/1999 |
| MX | PA 03010257 | 11/2003 |
| WO | WO 00/46728 | 8/2000 |
| WO | WO 02/067090 A2 | 8/2002 |
| WO | WO 02/091130 A2 | 11/2002 |

* cited by examiner

FIG. 3D.

My Package Listing

*← 213*

Search Past: ○ 1 ○ 7 ○ 30 ⊙ 180 Days   ○ or Date Range [          ] to [          ] mm/dd/yyyy   [Lookup]   Reset View

| ID | ▼ Ship To ▲ | ▼ Date Shipped ▲ | ▼ Shipping Method ▲ | Tracking Number | Details |
|----|-------------|------------------|---------------------|-----------------|---------|
| 1  | UPS         | 6/14/2001        | UPS Next Day Air    | 1ZT42T4601963372 44 | (Details) |

Showing 1 of 1

*Search shipping history*

*Click on Tracking number to view status*

*160*

*214*

*View details of shipment*

FIG. 3E.

PACKAGE DETAILS

216

Ship To Information

| | |
|---|---|
| Company Name: | UPS |
| Contact Name: | John Townsend |
| Address 1: | 55 Glenlake Pkwy NE |
| Address 2: | Bldg. 3, 6th Floor |
| City, State Zip: | Atlanta, GA 30328 |
| Phone: | (404) 828-6979 |
| Fax: | |

Package Information

| | |
|---|---|
| Package Type: | UPS Letter |
| Weight: | 0 |
| Shipping Method: | UPS Next Day Air |
| Tracking Number: | 1ZT42T4601963372244 |
| Date Shipped: | 06/14/2001 7:36:17am |
| Function Code: | 88427 |
| Employee Number: | 373 77 8833 |
| COD? | No |

Void Package  217  Reprint Shipping Label  218  Return to Package Listing

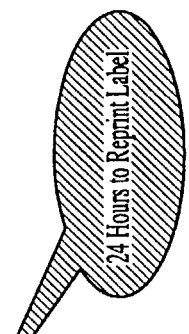

FIG. 3G.

Create New Location

Parent Company* [ABC Company ▼]
Location Name*
Primary Contact*
Phone/Ext.*
E-mail [x]
Fax
Printer Type* [Laser Printer ▼]
Location Active [✓]

Address 1*
Address 2*
Address 3*
City*
State*, Zip*
Country* [-None- ▼]
UPS Account#* [United States ▼] — 180

[Submit]    [Reset Form]

*indicates required field

Add New User

| | |
|---|---|
| Full Name* | Jim Smith |
| Login Name* | jsmith |
| Password* | *** |
| Confirm Password* | *** |
| User Active | ☑ |
| User Type* | Regular ▼ |

| | |
|---|---|
| Location* | ABC Alabama (ABC Company) ▼ |
| Email Address* | jsmith@abc.com |
| Phone/Ext.* | 123-252-1212 × |
| User Group* | ground only (ABC Company) ▼ |
| Traveling User | ☐ |

[ Submit ]   [ Reset Form ]

*indicates required field

FIG. 4C.

DISTRIBUTED-USER SHIPPING SYSTEM

CROSS-REFERENCE TO RELATED APPLICATIONS

This application is a continuation of U.S. Application No. 60/344,111 filed Dec. 27, 2001, which is hereby incorporated herein in its entirety by reference.

FIELD OF THE INVENTION

This invention relates to a shipping system for a group of distributed users to allow an administrator or group of administrators to maintain and control shipping by its users.

BACKGROUND OF THE INVENTION

An unsatisfied need has long existed in the package shipping industry for a shipping system that allows an organization to monitor and control the shipping activities of its users.

In the past, individuals within an organization that wanted to ship a package had to manually complete a shipping label and present the package to a carrier or other shipping drop-off location. The organization tracked these shipments by keeping copies of the shipping labels on file. This manual process was both cumbersome and time-consuming.

With the advent of the Internet, new shipping systems were introduced that allowed an individual to input shipping information to the shipping system and have a shipping label delivered to their browser. The shipping label could then be printed and affixed to the package. These electronic shipping systems were an improvement on the manual process, but they still did not allow an organization to monitor and control the shipping activity of its users. In addition, a user of one of these systems could not associate a particular package shipment with a particular client; therefore, the organization had to again manually review the shipping activities to bill the shipping charge to a particular client or department.

Another shipping system that was developed to address some of these concerns is the ship-ticket shipping system. In these systems, a user generates a ship-ticket on a personal computer and prints the ticket on a local printer. The ship-ticket is not a shipping label but has the shipping information encoded on the ticket as a bar code. The ship-ticket is affixed to the package and the package is delivered to shipping center or mail room of the organization where the bar code is scanned and the shipping information is electronically captured into a central shipping system. A shipping label is then generated by the central shipping system and affixed to the package. As with Internet shipping systems, a ship-ticket system automates the shipping process and eliminates the manual process of completing shipping labels. Moreover, because the ship-ticket passes through a central shipping system of the organization, the organization can monitor and control the shipping activities of its users. However, the process is cumbersome in that it requires an additional step of scanning a first label to generate a second label.

An unsatisfied need thus exists in the industry for an improved shipping system for organizations.

BRIEF SUMMARY OF THE INVENTION

The present invention addresses the above needs and achieves other advantages by providing a system and method for controlling a user's access to a carrier's shipping services for delivery of a package. The system controls the user's access to the carrier's services by either limiting the locations from which a package can be shipped to fewer than those described by the carrier's service area, or by limiting the user's ability to select shipping service levels to fewer than those provided by the carrier. For instance, the system can limit the ship from location to one or more business locations of an organization. Such limitation may be by way of displaying a limited collection of the ship from locations, or by pre-populating and locking ship from information submission fields on a web page. In an example of limiting the service levels, the service levels available to the user may be limited to only ground shipping when the carrier is capable of providing both air and ground shipping. Preferably, the distributed-user shipping system resides on a client server or mobile computer that is connected to the carrier's server and transmits various shipping location information and service level selections to the carrier to facilitate shipping of packages by geographically distributed users while controlling the scope of shipping services provided.

In one embodiment, the present invention includes a system for controlling a user's access over a network to a carrier server for coordinating shipping services provided by the carrier. In this embodiment, the carrier has a service area including a plurality of access locations at which it is willing to access the package to initiate shipping. The control system includes a ship to information system that is configured to record ship to information describing a destination location to which the package is to be delivered by the carrier. A ship from information system of the control system is configured to limit the user's selection of access locations. In particular, the number of access locations useable by the user are limited to a collection of access locations that are fewer than all of the access locations in the carrier's service area. For instance, in the case of a user who is an employee of an organization, the access locations may be limited to one or more work locations of the user. The ship from information system is also configured to record ship from information describing one of the limited access locations selected by the user. The control system further includes an order placement system that is configured to connect via the network to the carrier server and to transmit the ship from and ship to information to the carrier over the network to initiate shipping by the carrier of the package.

The ship from information system may be further configured to display a plurality of ship from information fields for recording the access selection. In this case, selection of one of the limited selection of access locations is alternatively, or further, ensured by pre-populating the information fields with portions of the access location and locking the fields so that the pre-populated access location portions cannot be modified by the user. In addition, the ship from information system may be configured to validate that the recorded ship from information describes one of the limited collection of access locations. In yet another alternative, selection of one of the limited collection of access locations is ensured by displaying only the limited collection of access locations in a menu for selection by the user.

Various components of the control system may be centrally located, or distributed over networked computer servers. In one aspect, the ship from, ship to and order placement systems reside on a client server which is connected via the network to the carrier server. In an alternative aspect, portions of the ship from, ship to and order placement systems reside on a mobile computers, such as a laptop computer. If part of the system is operated on the mobile computer, the ship from information system can be further configured to detect use by a traveling user operating the mobile computer and to make an exception that allows selection of any access location for the ship from information.

In yet another aspect, the control system includes a label generating system that is configured to generate a shipping label image. The shipping label image includes the ship to and ship from information and is useable by the user to print a shipping label for attachment to the package. In the case of a traveling user using a mobile computer to operate the system, the shipping label image may further include return address information that is different than the ship from information.

In another embodiment of the present invention, the control system includes a ship to information system configured to record ship to information submitted by the user that describes a destination location to which the package is to be delivered by the carrier. A ship from information system is configured to record ship from information submitted by the user that describes an access location from which the package is to be delivered by the carrier. The control system also includes a service level system configured to limit the user's selection of service levels to a collection of service levels that are fewer than all of the shipping service levels provided by the carrier and to record the service level selection by the user. An order placement system is configured to connect via a network to a carrier server and to transmit the ship from information, ship to information and service level selection to the carrier over a network to facilitate package delivery.

The service level system may be further configured to display the limited collection of service levels, such as in a menu, for selection by the user. For additional or alternative confirmation, the service level system may be further configured to validate that the recorded service level selection is one of the limited collection of service levels.

Similar to the above-described embodiment, the control system may be distributed over several networked computers, or may be on a single server. For instance, the ship from, ship to, service level and order placement systems may reside on a client server is which connected via the network to the carrier server. As another example, the portions of the system reside on a mobile computer.

In another aspect, the service level system is further configured to limit the shipping service level selection to an extent determined by the user's membership to a group of users all having the same limited collection of available shipping service levels. For instance, the carrier may offer ground and air shipping, but the users in the group would be limited by the distributed-user shipping system to just ground shipping.

Elements of each of the control system embodiments and aspects may be combined with each other, such as by limiting both the service level and ship from access location selected by the user. Beyond such combinations, the control system may include other aspects such as shipment billing and control of the destination location of each shipment. A billing system may record billing information from the customer, such as a client and matter account number, and transmit the billing information to the carrier using the order system so as to facilitate billing for delivery services by the carrier. The ship to information system can include aspects such as locked pre-population fields and validation engines to limit the destination locations to fewer than all of the destinations to which the carrier will deliver a package.

In another embodiment, the present invention includes a method of administering access by a user to a carrier's shipping services for delivery of a package. In this embodiment, the user is a member of an organization having a plurality of locations. The administration method includes sending organization information to the carrier over the network wherein the organization information includes an address of one of the locations and a shipping account number. The account number is validated by comparing the account number to a list of valid account numbers and by determining if the address corresponds to the address listed for the account number. Once validated, the location is added to a limited collection of ship from locations accessible by the carrier from which the user is permitted to ship the package. The limited collection of ship from locations describes fewer locations than a plurality of locations accessible by the carrier within its service area.

In another aspect, after validation the location may be associated with a department of the organization wherein the user is a member of the department and will be able to ship from the newly associated location. The administration method can also include displaying and sorting lists of previous shipping activity by one or more users. The lists may include, and be sorted using, ship to information, ship from information, transmission date, shipping date, shipping method (i.e., service level), user group or organization.

In still another embodiment, the present invention includes another method of administering access to a carrier's shipping services for delivery of a package. The administration method includes establishing a plurality of user groups each including at least one user. A limited collection of the carrier's shipping services is created including fewer shipping services than all the shipping services offered by the carrier. Then, the limited collection of shipping services is associated with the user group. The administration method further includes facilitating the user's access to the limited collection of shipping services by communicating shipping requests each containing one of the limited collection of shipping services selected by the user to the carrier.

In yet another embodiment, the present invention includes, a graphical user interface (such as the graphics displayed on a computer monitor) for controlling a user's access to a carrier's shipping services for delivery of a package. In this embodiment, the carrier has a service area describing a plurality of access locations at which the carrier is willing to access the package to initiate shipping. The graphical user interface includes a ship to information panel having a plurality of fields for recording portions of a destination location to which the package is to be delivered by the carrier. Also, a ship from information panel is included that has a plurality of fields pre-populated with portions of one of the plurality of access locations. The fields are locked against modification by the user to limit the user to shipping from the locked access location.

Each of the various embodiments of the present invention have several advantages. Generally, the distributed user shipping system allows tight control of shipping activities to be administered, especially over the ship from location and the level of service selected by the users. Limiting the ship from locations reduces the incidence of misuse of an organization's shipping accounts. Further, use of more expensive carrier service levels, such as overnight air shipping, can be reduced or eliminated. Shipping costs that are incurred can be billed directly to clients or departments based on account numbers, such as a cost center code, or department names. The shipping label system allows for the convenient generation of shipping labels bearing the ship to and ship from information, for immediate attachment to a package. Administrative aspects of the system allow for easy creation and modification of various user groups and organization locations each having different service levels and ship from locations available for shipping requests.

BRIEF DESCRIPTION OF THE DRAWINGS

Reference will now be made to the accompanying drawings, which are not necessarily drawn to scale, and wherein:

FIGS. 3A-3G illustrate a graphic user interface of a distributed user shipping system that allows a user to ship a package.

FIGS. 4A-4C illustrate a graphic user interface of a distributed user shipping system that establishes administration detail, user groups and users.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A. Architecture

Figure 1:
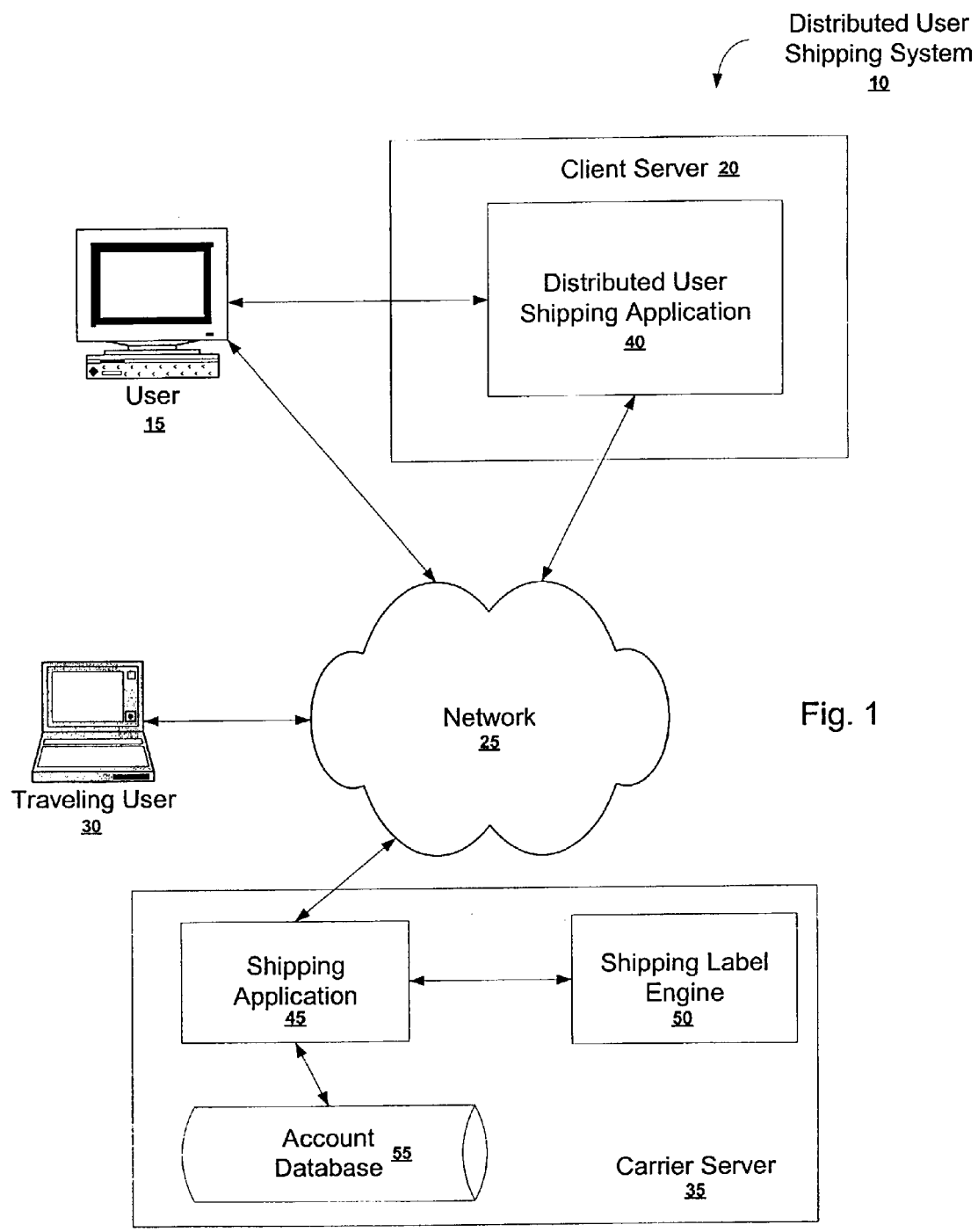
FIG. 1 illustrates the architecture of a distributed user shipping system.

FIG. 1 illustrates a distributed user shipping system 10 in accordance with an embodiment of the present invention. In this example, the distributed user shipping system 10 includes a plurality of users 15 in communication with a client server 20 and/or a computer network 25 such as the Internet. One or more traveling users 30 may also be in contact with the network 25 and/or the client server 20. The distributed user shipping system 10 also includes a carrier server 35 in communication with the network 25 and with the client server 20 via the network 25.

In one embodiment, a distributed user shipping application 40 resides on the client server 20 and is in communication with the network 25. Similarly, a carrier shipping application 45 resides on the carrier server 35 and communicates with the distributed user shipping application 40 via the network 25. Further, in this example a shipping label engine 50 and account database 55 also reside on the carrier server 35 and are in communication with the carrier shipping application 45. Although each of these system components are described herein as residing on either the client server 20 or carrier server 35, it will be readily apparent to one of ordinary skill in the art that one or all of the above-described components may reside on another server or function separately.

B. Package Shipment

Figure 2:
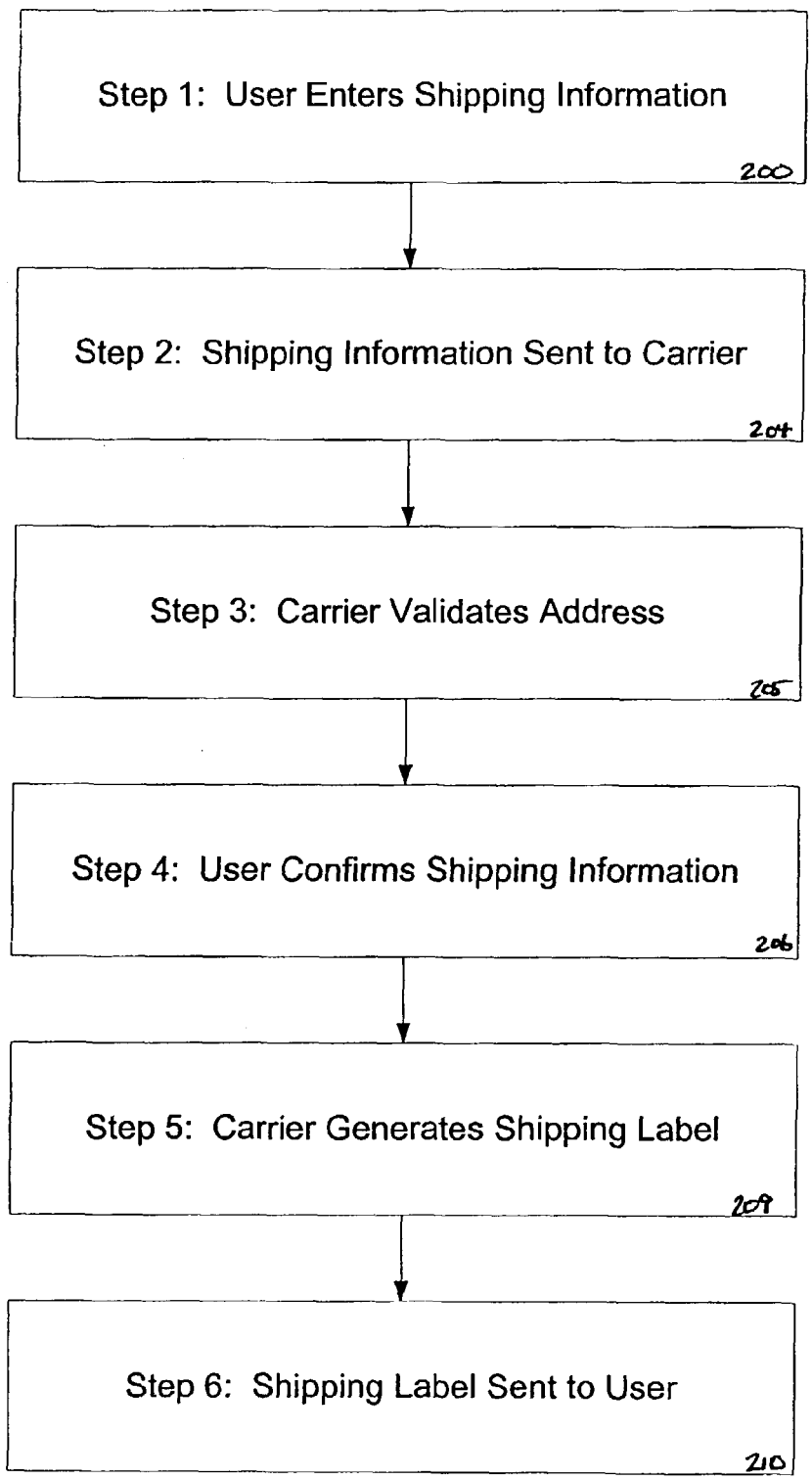
FIG. 2 shows the process flow that allows a user to ship a package using the distributed user shipping system.
Figure 3A:
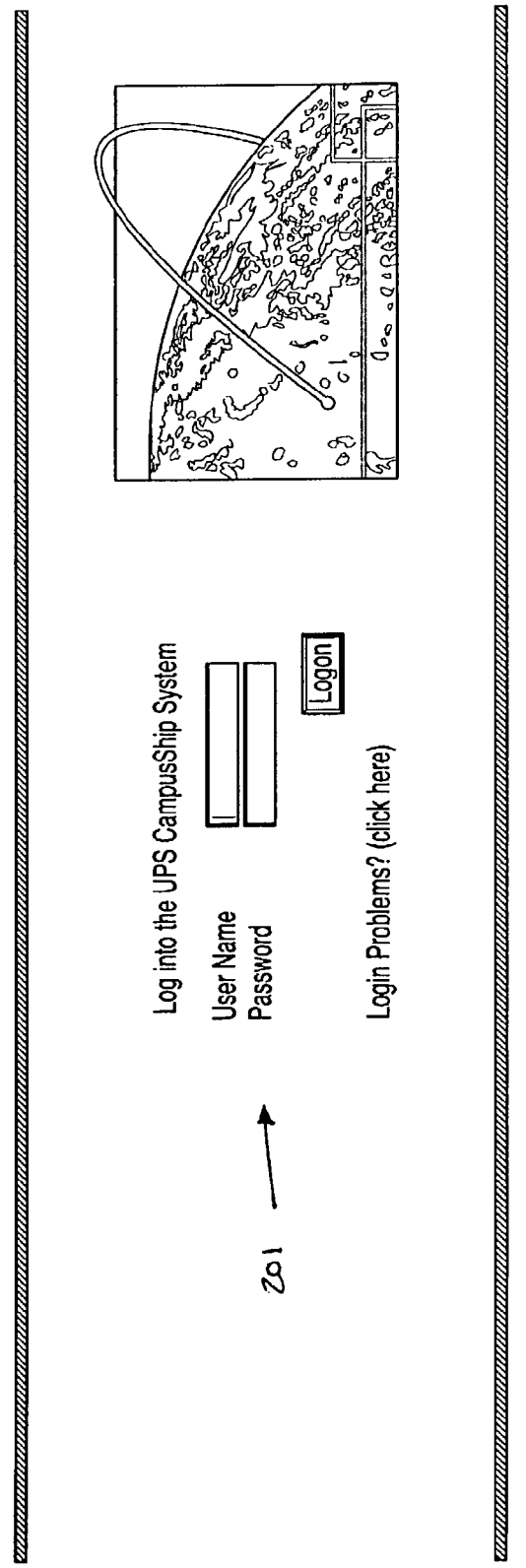

FIG. 2 illustrates one process by which a user 15 may obtain a shipping label 100 for a package or letter using the distributed user shipping system 10 of the present invention. In a first step 200, a user 15 enters the necessary shipping information into the distributed user shipping application 40. FIG. 3A illustrates a graphical user interface (GUI) login screen shot 201 that a user 15 might use to access the distributed user shipping application 40. Upon entering a valid user name and password, the user 15 is presented with a list of options. If the user 15 elects to ship a package, the user sees a GUI information entry screen 202 similar to that shown in FIG. 3B. In an alternative embodiment, the user 15 does not receive a list of options and instead is presented with a GUI shipping confirmation screen 203 shown in FIG. 3C.

Figure 3B:
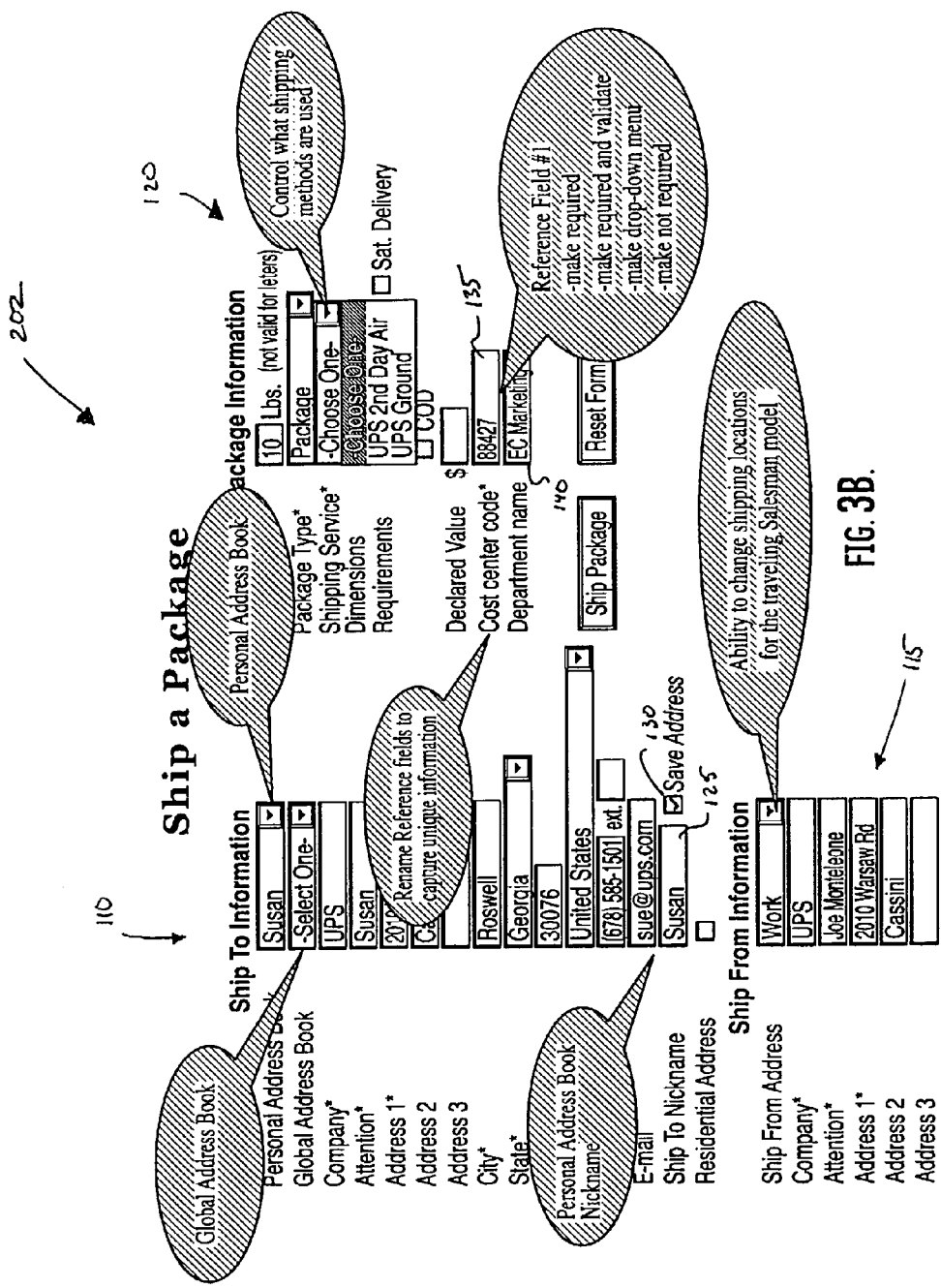

The GUI of FIG. 3B is separated into three parts: a ship to information section 110, a ship from information section 115, and a package information section 120. Each of the sections has a plurality of entry fields for entry of portions of the section's respective information. In general, the user 15 is prompted to input the destination shipping information for the package in the ship to information section 110. The fields in the ship from information section 115 are pre-populated with the user address information that has previously been associated with the user name and password. Alternatively, these fields may be populated with a location address for the organization to which the user is associated. If the user is designated as a traveling user 40 (described below), a drop-down menu may be available that allows the traveling user 40 to select one of several addresses for the ship from information section 115. In one embodiment, the user is not given the opportunity to change the information in the ship from information section 115. In an alternative embodiment, these fields are user-modifiable. The information in the ship to and ship from sections is sufficient to ship a letter in the distributed user shipping system 10. If the user 15 is shipping a package, the user 15 is prompted to populate those fields shown in the package information section 120.

In one embodiment, a user 15 has the option of entering a nickname for the recipient of the letter or package in a ship to nickname field 125. When this field is populated, the distributed user shipping application 40 will compare the nickname against a database of recipients and will populate the ship to information section 110 of the GUI 202 with the recipient information stored in the database. By checking the save address field 130 shown in FIG. 3B, a user 15 can add or modify an entry in the recipient database.

In one embodiment, the user 15 also has the option of associating the shipment with a particular client or department. In this embodiment, the user 15 is prompted to enter a cost center code 135 and a department name 140, one or both of which may be used to associate the shipment. For example, a user 15 can bill the cost of the shipment to the client identified in these fields. As another example, the user 15 may be responsible for multiple matters for a single client and may use these fields to associate the shipment with a particular matter for the client. One of ordinary skill in the art will readily recognize that these and other fields can be used to allow a user 15 and an organization to accurately monitor, control and track package shipments. To illustrate, if the organization is a law firm, the cost center code 135 and department name 140 fields may be renamed as client and matter number fields respectively. In this way, the law firm can track the package shipments for each client and matter combination and charge the shipping costs appropriately. One of ordinary skill in the art will recognize that these and other fields can be added to allow an organization to track shipments made by its users. In alternative embodiments, one or both of these fields may be designated as "required" before a package can be sent and the information used to populate these fields may be validated.

Returning to FIG. 2, after entering the required shipping information the distributed user shipping application 40 sends the shipping information to the carrier shipping application 45 in step two 204. In one embodiment, the shipping information is transmitted over the Internet but it will be readily apparent to one of ordinary skill in the art that that the information can be sent via any type of electronic communication, including wireless technology. In step three 205, the carrier shipping application 45 performs a series of validation routines on the shipping request. In one embodiment, the carrier shipping application validates the destination shipping address to confirm that the destination address exists and has been properly entered. In addition, the carrier shipping application 45 may validate that the user 15 is permitted to perform the shipping activity requested. For example, a user 15 may submit a request for a package delivery service level, such as overnight shipping, but may only be authorized to request a lesser service level. In an alternative embodiment, some or all of these validation routines may occur at the client server 20 and may be performed by the distributed user shipping application 40 or another application. For example, a user 15 that is authorized to ship packages using only select service levels may not see those package shipping service levels that the user 15 is not authorized to use.

Figure 3C:

If one or more of the validation procedures fail, an error code is returned to the user. Once the shipping information passes the validation routines, the process proceeds to step four 206 where the user 15 is shown the GUI shipping confirmation screen 203 as shown in FIG. 3C and is prompted to confirm that the shipping information is correct. If the information is incorrect, the user 15 has the option to modify the shipping information via an Edit Package Info button 207. Once the shipping information is correct, the user 15 proceeds by clicking on a Ship This Package button 208.

Returning again to FIG. 2, a shipping label 100 is generated 209 when the user 15 clicks on the Ship This Package button 208. To generate the shipping label 100, the distributed user shipping application 40 passes the shipping information to the carrier shipping application 45. The carrier shipping application 45 passes the shipping information to a shipping label engine 50 configured to create shipping labels. The process of generating shipping labels from shipping information is well known in the art and is beyond the scope of this disclosure. Once the shipping label 100 is generated, the shipping label engine 50 passes the shipping label 100 back to the carrier shipping application 45, which, in turn, transmits the label back to the distributed user shipping application 40 and the user 15 in step six 210.

Figure 3D:
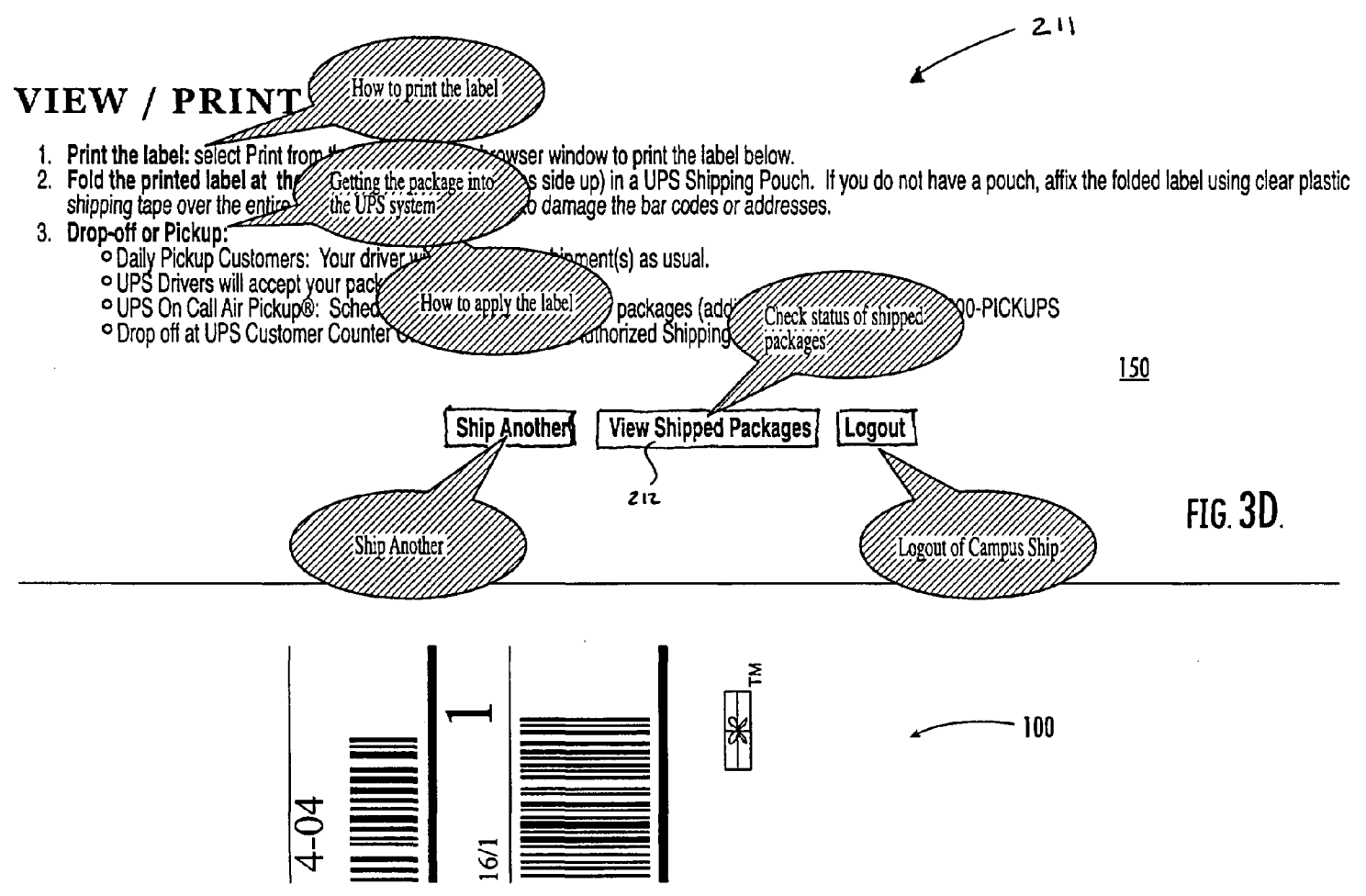

FIG. 3D illustrates a GUI label screen 211 that a user 15 receives in response to a valid request for a shipping label 100. FIG. 3D is divided into two parts and includes a shipping label instruction area 150 and a shipping label 100. In this example, the shipping label instructions tell the user how to print and fold the label and where to drop if off for pickup. The shipping label instruction area 150 also contains prompts that allow the user 15 to ship another package, view shipped packages and logoff. If a View Shipped Packages button 212 is activated, the user 15 receives a GUI package listing screen 213 similar to that shown in FIG. 3E.

FIG. 3E illustrates a GUI screen that allows a user 15 to obtain detail about packages that have been shipped. In one embodiment, every shipping label 100 generated by the distributed user shipping system 10 includes a unique package tracking number 160. As a package travels through the carrier system to its destination address, the package tracking number 160 is scanned at various carrier sortation and routing facilities and a carrier database is updated with information on the progress of the package. The GUI package listing screen 213 shown in FIG. 3E shows the user 15 a list of shipment recently sent. In one embodiment, the user 15 sees a list of shipments made by that particular user. In this embodiment, the user 15 has the ability to expand or shrink the list by requesting a search on past shipments of one day, one week, one month or six months. Of course, additional search parameters are available and may be readily implemented with the present invention. In an alternate embodiment, a user 15 can search past shipments by organization, client, user name, date range, destination address, shipping method or using multiple other search parameters that will be readily apparent to one of ordinary skill in the art.

Figure 3F:
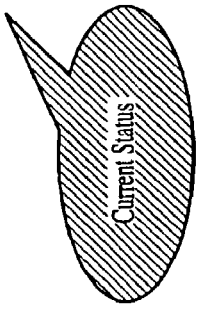

For each shipment listed in FIG. 3E, the user 15 has the option to view the shipment status by clicking the package tracking number 160 or can view package detail information by clicking on a detail button 214. FIG. 3F illustrates a GUI package tracking information screen 215 available to a user 15 and FIG. 3G illustrates a package detail information screen 216 that can be obtained. In addition, Void Package 217 and Reprint Shipping Label 218 options are also illustrated in FIG. 3G. In one embodiment, the user 15 has an option of voiding a shipping label 100 that was mistakenly generated and thereby avoids paying the shipping fee. In this embodiment, the carrier debits a shipping account in the amount of the shipping fee when the shipping label 100 is generated. The shipping account is thus charged even if the shipping label 100 is never affixed to a package and placed in the carrier system. However, a carrier will credit a shipping account for the shipping fee associated with a shipping label 100 when a user 15 clicks on the Void Package link 217. In one embodiment, a user has predetermined time after the creation of a shipping label 100 to void the transaction and/or reprint the label. In a preferred embodiment, the predetermined time is 24-hours.

C. Administration

The following paragraphs describe an administration system in accordance with an embodiment of the present invention. One aspect of the distributed user shipping system 10 is an application that permits the users 15 of an organization or other group to automate their shipping activities and associate shipments with a particular client, matter or department. Another aspect of the system is an administration application that permits a organization to monitor and control the shipping activities of those users 15.

In one embodiment of the present invention, an organization or other distributed group of users 15 initiates a distributed user shipping system 10 by registering with one or more carriers and identifying an organization administrator. The organization administrator is the highest-level user of a distributed user shipping system 10 and has the highest level of authorization within the organization. In one embodiment, an organization has only one organization administrator, but it will be readily apparent to one of ordinary skill in the art that the present invention can be equally advantageous with multiple highest-level users. The requirements to register an organization administrator may vary from carrier to carrier. In one embodiment, an organization administrator registration requires an organization name, organization address, administrator name, administrator address, administrator phone number and an administrator email.

Other information and/or shipping transaction options may also be required to register an organization administrator. The organization administrator registration process may also require that the organization administrator determine what information the users 15 must supply to request a shipping label 100. A law firm, for example, might require that its users 15 include a billing client and matter number every time that a shipping label 100 is generated. The designation of mandatory fields labeled client and matter, therefore, may be part of the organization administration registration process.

Additional layers of user administration are also available with the present invention. In one embodiment, an organization has the ability to determine the number of layers of administration. In an alternative embodiment, the number of administrations layers is predetermined. In still another embodiment of the present invention, there is just one administrator.

In one embodiment of the present invention, a second administration layer is a location administrator 175. Location administrators 175 might be used in the case of a company with multiple offices spread out throughout a geographical area. In some cases the locations might be located in separate states, or even across continents. In another example, the separate locations may be different departments on a college campus, or even different departments within a single office building.

FIG. 4A illustrates a GUI location creation screen 219 to prompt a user 15 to create a new location. In a preferred embodiment, there is at least one location associated with every organization. In this illustration, the addition of a new location requires the organization name, administrator name, phone number, email address, facsimile and printer type for the location. In addition, the street address, city, state and zip for the location is required. In one embodiment, a carrier account number 180 is also required for a location administrator 175. Carrier account numbers 180 are generally tied to a zip code or other geographical area as shipping costs are based upon the distance between pickup and delivery points. For this reason, a carrier account number 180 in this embodiment is specified for each organization location rather than at the organization administrator level.

When a new location is added to the system, the distributed user shipping application 40 sends the organization location information to the carrier shipping application 45. The carrier shipping application 45 compares the carrier account number 180 for the new location and the address of the new location against an account database 55 of valid customer account numbers. If the carrier account number 180 is valid for the location zip code, the location information and/or location administrator 175 is added to the distributed user shipping system 10. If the carrier account number 180 is not a valid account number and/or is not valid for the specified location address, an error code is returned and the new location/location administrator 175 is not added.

In one embodiment, only the organization administrator has authority to create a new location. In alternative embodiments, some or all of the location administrators 175 may be authorized to create new locations.

Figure 4B:
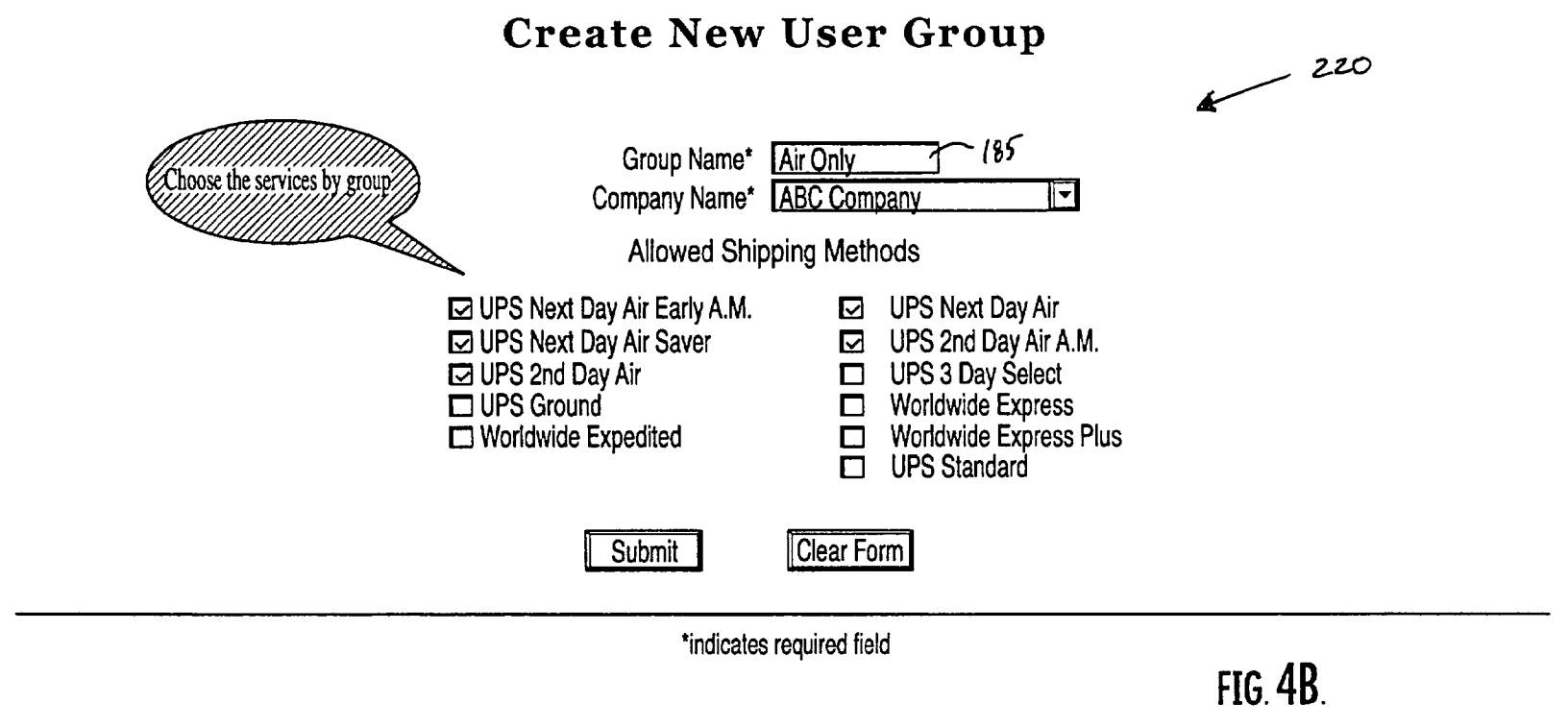

Another layer of administration in a distributed user shipping system 10 of the present invention is a user group 185. In one embodiment of the present invention, a user group 185 determines the shipping service level that will be permitted for those users 15 associated with that user group 185. In alternative embodiments, additional user authorizations may be determined by the user group 185 including, without limitation, the ability to generate shipment reports, to access other user shipment information, to create new users or administrators, or to use a organizational or global shipping address database. Additional rights related to package shipping may be determined at the user group 185 level and will be obvious to one of ordinary skill in the art. FIG. 4B illustrates a GUI group creation screen 220 that might be used to define a user group 185. In this example, users 15 within this particular user group 185 will be able to ship letters and packages based on the service levels selected.

FIG. 4C illustrates a GUI new user screen 221 to create a new user 15. In the illustrated embodiment, a new user 15 must be associated with an organization, location and user group 185. A name, login name, password and user-type 190 are also required fields in this embodiment. In this illustration, the user-type field 190 is designated as regular. In a preferred embodiment, a regular user 15 is authorized only to ship packages. In contrast, if a user-type 190 of administrator were assigned, the user 15 would be authorized to perform predetermined administrative functions as well as having authorization to ship packages. The GUI new user screen 221 thus provides for the creation of different administration levels including the organization administrator and one or more location administrators. One of ordinary skill in the art will readily recognize that additional administration levels can be created and assigned in this way.

In one embodiment, a user may be designated as a traveling user 30. Traveling users 30 are those users authorized to ship a package from a remote location. In one embodiment, a traveling user 30 is authorized to ship only from one of the locations associated with the organization. In another embodiment, a traveling user 30 is authorized to generate a shipping label 100 and ship a package from any location. For example, a corporate organization may employ a number of salespeople whose job entails traveling to meet clients. These employees may need access to the distributed user shipping system 10 and may need to ship packages while on the road.

With reference to FIG. 1, a traveling user 30 is illustrated in communication with the network 30 rather than directly connected to the client server 20. In this embodiment, because the user is designated as a traveling user 30 he or she can use the distributed user shipping system 10 to ship a good from a remote location. In one embodiment, the distributed user shipping application 40 resides on a mobile computer used by the traveling user 30. In another embodiment, the traveling user 30 accesses the distributed user shipping application 40 on the client server 20 from a remote location.

In operation, if a user is designated as a traveling user 30 the user has the option of changing the ship from information on the system. In one embodiment, the new ship from information will be reflected on the return address on the shipping label 100. In another embodiment, however, the return address on the shipping label 100 is not changed and remains the default return address as would appear for any user. From a carrier perspective, when a traveling user 30 ships a package the cost of the shipment is based upon the modified ship from information and therefore is not necessarily calculated based on the return address on the shipping label 100.

Each of the various embodiments of the present invention have several advantages. Generally, the distributed user shipping system 10 allows tight control of shipping activities to be administered, especially over the ship from location and the level of service selected by the users 15. Limiting the ship from locations reduces the incidence of misuse of an organization's shipping accounts. Further, use of more expensive carrier service levels, such as overnight shipping, can be reduced or eliminated. Costs that are incurred can be billed directly to clients or departments based on account numbers, such as the cost center code 135, or department names 140. The shipping label engine 50 allows for the convenient generation of shipping labels bearing the ship to and ship from information for immediate attachment to a package. Administrative aspects of the system 10 allow for the creation and modification of various user groups and organization locations each having different service levels and ship from locations available for shipping requests.

FIGS. 1, 2, 3A-3G and 4A-4C are block diagrams, flowcharts and control flow illustrations of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer program product for controlling a user's access to a carrier's shipping services for delivery of a package, said carrier having a service area describing a plurality of access locations at which the carrier is willing to access the package to initiate shipping, the computer program product comprising at least one computer-readable storage medium having computer-readable program code portions stored therein, the computer-readable code portions comprising:
    a first executable portion for identifying the user;
    a second executable portion for identifying a user group of an organization, wherein the user is a member of the user group and the organization;
    a third executable portion for identifying a limited collection of access locations within the organization, wherein the limited collection of access locations are accessible by the carrier to deliver or receive one or more packages and the limited collection of access locations comprises fewer locations than the plurality of access locations accessible by the carrier within the service area;
    a fourth executable portion for causing display of at least a portion of the limited collection of access locations;
    a fifth executable portion for recording ship to information submitted by the user, said ship to information describing a destination location to which the package is to be delivered by the carrier;
    a sixth executable portion for recording ship from information describing one of the limited collection of access locations selected by the user;
    a seventh executable portion for validating that the access location selected by the user is one of the limited collection of access locations,
    wherein identifying the limited collection of access locations comprises evaluating one or more rights assigned to the user, the rights being associated with data indicating whether the user is permitted to utilize the limited collection of access locations to deliver or receive the packages;
    an eighth executable portion for providing a plurality of different shipping service levels provided by the carrier, each of the service levels comprising data indicating a different mode of shipping the package; and
    a ninth executable portion for identifying a limited collection of shipping service levels, the limited collection of shipping service levels being a subset of the shipping service levels provided by the carrier, and
    wherein identifying the limited collection of shipping service levels comprises evaluating the data associated with at least one of the rights assigned to the user, the at least one right comprising information indicating whether the user is permitted to utilize one or more of the subset of the shipping service levels to facilitate delivery of the package.

2. The computer program product of claim 1, further comprising a tenth executable portion for causing transmission of the ship from and ship to information to the carrier over a network after successfully validating the access location so as to facilitate delivery of the package from the selected access location to the destination location by the carrier.

3. The computer program product of claim 1, wherein each of the limited collection of access locations is associated with a work group of the user.

4. The computer program product of claim 1, wherein causing display of at least a portion of the limited collection of access locations includes pre-populating a plurality of ship from information fields with portions of a single access location, said information fields used for recording ship from information.

5. The computer program product of claim 4, further comprising a tenth executable portion for locking the ship from information fields against modification of the portions of the single access location after pre-populating the ship from information fields.

6. The computer program product of claim 5, wherein the single access location is associated with a work group of the user.

7. The computer program product of claim 1, further comprising a tenth executable portion for generating a shipping label image based on the ship to and ship from information, said shipping label image usable by the user to print a shipping label for attachment to the package.

8. The computer program product of claim 1, further comprising:
    a tenth executable portion for causing display of the limited collection of shipping service levels available to the user; and
    an eleventh executable portion recording a shipping service level selection by the user and transmitting the shipping service level selection, the ship from information and the ship to information over a network to the carrier after successfully validating the access location and the selected shipping service level so as to facilitate delivery of the package.

9. The computer program product of claim 8, wherein the shipping service levels provided by the carrier are at least ground and air shipping and wherein the displayed collection of shipping service levels is limited to ground shipping.

10. The computer program product of claim 8, further comprising a twelfth executable portion for validating the user's ability to request the shipping service level by confirming that the user belongs to the group.

11. The computer program product of claim 1 further comprising a tenth executable portion for identifying a limited collection of destination locations associated with the user group, wherein the limited collection of destination locations comprises fewer locations than a plurality of destination locations accessible by the carrier within the service area.

12. The computer program product of claim 1, further comprising a tenth executable portion for recording billing information from the user and causing transmission of the ship to information, ship from information and the billing information over a network to the carrier after successfully validating the selected access location so as to facilitate billing by the carrier for delivery of the package.

13. The computer program product of claim 12, wherein the billing information includes client and matter information.

14. The computer program product of claim 1, wherein the access location selected by the user comprises a work location of the user.

15. The computer program product of claim 1, wherein the access location selected by the user is associated with a department of the organization and the user is a member of the department.

16. The computer program product of claim 1, further comprising:
- a tenth executable portion for evaluating the data associated with the rights; and
- an eleventh executable portion for identifying one or more of the limited collection of access locations that the user is permitted to select to deliver or receive the packages via the one or more access locations.

17. The computer program product of claim 1, wherein validating comprises verifying the user's ability to select the access location by confirming that the user belongs to the user group.

18. The computer program product of claim 1, wherein the limited location of access locations are accessible by the carrier to deliver one or more packages.

19. The computer program product of claim 1, wherein the limited location of access locations are accessible by the carrier to receive one or more packages.

20. The computer program product of claim 1, further comprising:
- a tenth executable portion for facilitating display of at least a portion of the limited collection of shipping service levels; and
- an eleventh executable portion for facilitating receipt of a selection of at least one of the limited collection of shipping service levels,
- wherein the selected service level identifies a manner in which to transport the package to a delivery location within a predetermined time period.

21. The computer program product of claim 20, wherein the display is free from showing service levels, that the user is unauthorized to utilize for shipping the package, the computer program product further comprising:
- a twelfth executable portion for determining unauthorized service levels based on analyzing the information of the at least one right.

22. The computer program product of claim 20, further comprising:
- a twelfth executable portion for validating that the selected shipping service level is one of the limited collection of shipping service levels; and
- a thirteenth executable portion for verifying that the user is authorized to utilize the selected shipping service level to ship at least one of the packages based on evaluating the data associated with the at least one right of the user.

23. The computer program product of claim 1, further comprising:
- a tenth executable portion for determining that the user is only able to utilize at least one of the limited collection of shipping service levels to facilitate delivery of the package to a destination based at least in part on the information of the at least one right.

* * * * *